US010896253B2

(12) United States Patent
Liu et al.

(10) Patent No.: US 10,896,253 B2
(45) Date of Patent: Jan. 19, 2021

(54) PROCESSOR TRACE-BASED ENFORCEMENT OF CONTROL FLOW INTEGRITY OF A COMPUTER SYSTEM

(71) Applicant: Huawei Technologies Co., Ltd., Shenzhen (CN)

(72) Inventors: Yutao Liu, Shanghai (CN); Haibo Chen, Shanghai (CN); Peitao Shi, Shanghai (CN); Xinran Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 339 days.

(21) Appl. No.: 15/887,468

(22) Filed: Feb. 2, 2018

(65) Prior Publication Data

US 2018/0225446 A1   Aug. 9, 2018

Related U.S. Application Data

(60) Provisional application No. 62/455,523, filed on Feb. 6, 2017.

(51) Int. Cl.
  *G06F 11/00*  (2006.01)
  *G06F 21/52*  (2013.01)
  (Continued)

(52) U.S. Cl.
  CPC .......... *G06F 21/52* (2013.01); *G06F 11/3466* (2013.01); *G06F 11/3612* (2013.01);
  (Continued)

(58) Field of Classification Search
  CPC .. G06F 11/3466; G06F 21/52; G06F 11/3612; G06F 11/3636; G06F 21/577;
  (Continued)

(56) References Cited

U.S. PATENT DOCUMENTS 6,047,124 A * 4/2000 Marsland ............ G06F 11/3466
  714/E11.2
7,130,786 B2 * 10/2006 Grebenev ........... G06F 9/45537
  703/22

(Continued)

FOREIGN PATENT DOCUMENTS

CN   101473300 A   7/2009
CN   104134038 A   11/2014
  (Continued)

OTHER PUBLICATIONS

Xia, Yubin, et al. "CFIMon: Detecting violation of control flow integrity using performance counters." IEEE/IFIP International Conference on Dependable Systems and Networks (DSN 2012). IEEE, 2012, pp. 1-12.*

(Continued)

*Primary Examiner* — Farid Homayounmehr
*Assistant Examiner* — Lizbeth Torres-Diaz
(74) *Attorney, Agent, or Firm* — Leydig, Voit & Mayer, Ltd.

(57) ABSTRACT

A computer processing node is described that is configured to perform a control flow integrity (CFI) method on a protected process operating on the processing node. The CFI method includes intercepting a system call originating from execution of the protected process executing in the runtime environment. A fast path operating within a kernel of the computer system accesses, from a kernel memory, a processor trace packet corresponding to the system call. The fast path attempts to establish a match between the processor trace packet and a program control flow (edge) entry within a credit-labeled control flow graph (CFG) definition having an associated credit value. The credit value represents a degree to which the program control flow is credible. Thereafter, the method further includes invoking, after the matching, a slow path for further processing of the processor (Continued)

trace packet if the associated credit value does not meet a specified threshold, and otherwise provide an indication to permit execution of the system call.

12 Claims, 3 Drawing Sheets

(51) Int. Cl.
*G06F 11/34* (2006.01)
*G06F 11/36* (2006.01)
*G06F 21/57* (2013.01)

(52) U.S. Cl.
CPC ........ *G06F 11/3636* (2013.01); *G06F 21/577* (2013.01); *G06F 2221/033* (2013.01)

(58) Field of Classification Search
CPC ............. G06F 2221/033; G06F 16/285; H04L 63/1408
See application file for complete search history.

(56) References Cited

U.S. PATENT DOCUMENTS

| | | | | |
|---|---|---|---|---|
| 9,471,461 | B2 * | 10/2016 | Rhee | G06F 11/3466 |
| 2004/0128539 | A1 * | 7/2004 | Shureih | H04L 63/1458 |
| | | | | 726/22 |
| 2006/0161978 | A1 | 7/2006 | Abadi et al. | |
| 2008/0184016 | A1 * | 7/2008 | Erlingsson | G06F 9/30061 |
| | | | | 712/233 |
| 2013/0024676 | A1 * | 1/2013 | Glew | G06F 9/30076 |
| | | | | 712/244 |
| 2013/0326625 | A1 * | 12/2013 | Anderson | G06F 21/566 |
| | | | | 726/23 |
| 2014/0090067 | A1 * | 3/2014 | Tripp | G06F 21/577 |
| | | | | 726/25 |
| 2014/0298300 | A1 | 10/2014 | Rhee et al. | |
| 2015/0286821 | A1 * | 10/2015 | Ghose | G06F 9/3861 |
| | | | | 713/187 |
| 2015/0356294 | A1 * | 12/2015 | Tan | G06F 21/54 |
| | | | | 726/22 |
| 2016/0110542 | A1 * | 4/2016 | Shanbhogue | G06F 21/52 |
| | | | | 726/23 |
| 2016/0283714 | A1 * | 9/2016 | LeMay | G06F 21/52 |
| 2017/0024562 | A1 | 1/2017 | Rombouts et al. | |
| 2018/0095764 | A1 * | 4/2018 | Sultana | G06F 9/3016 |
| 2018/0225446 | A1 * | 8/2018 | Liu | G06F 21/577 |
| 2018/0253547 | A1 * | 9/2018 | Sultana | G06F 11/36 |
| 2018/0260313 | A1 * | 9/2018 | Singi | G06F 11/3636 |
| 2019/0163900 | A1 * | 5/2019 | Zhang | G06F 21/567 |
| 2020/0125478 | A1 * | 4/2020 | Iyer | G06F 11/3636 |

FOREIGN PATENT DOCUMENTS

| | | |
|---|---|---|
| CN | 104823172 A | 8/2015 |
| CN | 105868626 A | 8/2016 |

OTHER PUBLICATIONS

Pappas, "kBouncer: Efficient and Transparent ROP Mitigation," XP055187978, pp. 1-8, Columbia University, New York, New York (Apr. 1, 2012).

Yuan et al., "Hardware-Assisted Fine-Grained Code-Reuse Attack Detection," International Symposium on Recent Advances in Intrusion Detection, XP047324961, pp. 66-85, Springer International Publishing, Switzerland (2015).

Liu et al., "Transparent and Efficient CFI Enforcement with Intel Processor Trace," 2017 IEEE International Symposium on High Performance Computer Architecture (HPCA), XP033094168, pp. 529-540, Institute of Electrical and Electronics Engineers, New York, New York (Feb. 4-8, 2017).

Gu et al., "PT-CFI: Transparent backward-edge control flow violation detection using intel processor trace," CODASPY 17: Proceedings of the Seventh ACM on Conference on Data and Application Security and Privacy, XP2796370, pp. 173-184, ACM SIGSAC (Mar. 2017).

Abadi et al.,"Control-Flow Integrity", Proceedings of the 12th ACM Conference on Computer and Communications Security, ACM (2005).

Ye ,"Research and Application about Whole-system Dynamic Analysis Technique on ARM," Computer Science and Technology, (Apr. 2014).

Xia et al., "CFIMon: Detecting Violation of Control Flow Integrity using Performance Counters," 2012 42nd Annual IEEE/IFIP International Conference on Dependable Systems and Networks (DSN), Institute of Electrical and Electronics Engineers, New York, New York (Jun. 25-28, 2012).

Davi et al.,"HAFIX: Hardware-Assisted Flow Integrity Extension," DAC '15 San Francisco, CA, USA, (2015).

Davi et al., "Hardware-Assisted Fine-Grained Control-Flow Integrity: Towards Efficient Protection of Embedded Systems Against Software Exploitation," DAC '14, San Francisco, CA, USA, (2014).

Pappas et al., "Transparent ROP Exploit Mitigation using Indirect Branch Tracing," 22nd USENIX Security Symposium, USENIX Security, (2013).

Du Guiran, "Multi-Path Trace Processors," National University of Defense Technology of the Chinese People's Liberation Army, total 118 pages (Mar. 15, 2004). With English abstract.

Kyungmin, "Utilization of Intel Processor Trace Hardware for Efficient Context-sensitive Control-Flow Integrity," Department of Electrical and Computer Engineering, pp. 1-56, Seoul National University, Seoul, South Korea (2016).

* cited by examiner

Legend
(For 3A, 3B, and 3C)

PROCESSOR TRACE-BASED ENFORCEMENT OF CONTROL FLOW INTEGRITY OF A COMPUTER SYSTEM

CROSS-REFERENCE TO RELATED APPLICATIONS

This application claims the benefit to U.S. Provisional Application No. 62/455,523 filed Feb. 6, 2017, which is expressly incorporated by reference in its entirety, including any references contained therein.

FIELD OF THE PATENT APPLICATION

This patent application relates generally to the field of real-time/online cyber defense systems incorporated into computer systems. More particularly, the patent application is directed to a computer system including control flow integrity (CFI) monitoring capability that is based upon online analysis of a processor trace output provided by a hardware-implemented processor trace functionality (e.g. Intel Processor Trace).

BACKGROUND

A wide variety of cyber defense approaches have been implemented to counter cyber attacks. In response to cyber defenses directed to preventing code injection, cyber attackers have adapted their approach to exploit/reuse existing program code. Instead of adding new code to programs, attackers utilize existing code in unintended ways through sophisticated call sequences. For example, return oriented programming and its variants exploit weaknesses in existing program code through arbitrary execution of existing code. Control flow integrity (CFI) has emerged as a tool/property that utilizes the known/established control flow pattern of calls between computer code modules to identify and countering code reuse-based cyber attacks by recognizing/rejecting attempts to carry out irregular control flow between computer code modules.

Control flow integrity is not a new concept to cyber defense developers. However, adoption of CFI-based cyber defenses has been hindered by the high computing resource overhead generally associated with carrying out CFI-based cyber defenses. The high overhead and associated performance degradation renders such approach impractical in an online/real-time processing environment. In order to render an effective CFI-based cyber defense capability in a live processing environment, it was believed that a balance must be struck between: precision (i.e., the enforcement must be fine-grained enough to eliminate as much attack surface as possible); efficiency (i.e., the imposed runtime overhead should be small; and transparency (i.e., the approach should be transparent to applications, easily deployable on existing OS and hardware and generally compatible with existing security mechanisms).

Carrying out CFI through hardware-based processor traces is seen as having significant promise. Several control flow tracing mechanisms in hardware currently exist. Each form of hardware-based CFI implementations represents a different set of tradeoffs between precision, tracing overhead, decoding overhead, and available filtering mechanisms. A Branch Trace Store (BTS) CFI implementation captures each control transfer event (e.g., call, return and all types of jumps) as a separate record instance in a memory-resident BTS buffer. Each resulting record contains the addresses of a source and a target of the branch instruction. Thus, there is no need to decode the records. However, BTS introduces a very high processing overhead during tracing and is inflexible due to the lack of event filtering mechanisms. A Last Branch Record (LBR) CFI implementation supports event filtering (e.g., filtering out conditional branches). However, LBR records only 16 or 32 most recent branch pairs (source and target) into a register stack. Though LBR incurs very low tracing overhead, it can hardly provide precise protection due to the limited history of branch pairs available for analysis at any point in time.

Due to their capability of dynamically tracing control flow, BTS and LBR may support defenses against Return Oriented Programming-like attacks. However, BTS and LBR require a tradeoff between incurring high overhead (e.g. BTS) or sacrificing a level of resulting security due to imprecise tracing (e.g. LBR).

INTEL introduced processor trace capabilities in INTEL's Core M and 5th generation Intel Core processors. Each of these processors includes CPU cores having their own IPT hardware that generates trace information of running programs in the form of packets. The processor trace configuration operation is limited to privileged agents (e.g. the operating system) using certain model-specific registers (MSRs). The traced packets are written to the pre-configured memory buffer in a compressed form to minimize the output bandwidth and reduce the tracing overhead. A software decoder decodes the processor trace packets based on a pre-defined format. A control agent provides extra information, including program binaries and some runtime data, to precisely reconstruct the program flow. Aggressive compression of traces facilitates collecting more control flow tracing information including: control flow, execution modes, and timings—all while incurring much less tracing overhead than BTS. However, the high degree of encoding incurs a cost in the form of orders of magnitude slower decoding speed than tracing.

Referring to Table 1 below, an example of a set of 9 execution control flows (Execution Flow) and corresponding IPT trace packets (if logged) are provided.

TABLE 1

| No. | Execution Flow | Traced Packets |
| --- | --- | --- |
| 1 | 0x8fa jg 0x8fe // taken | TNT(1) |
| 2 | 0x8fe jmpq *%rax // %rax = 0x905 | TIP(0x905) |
| 3 | 0x905 callq fun1 | |
| 4 | 0x90a mov -0x18(%rbp),%rax fun1: | |
| 5 | 0x940 . . . | |
| 6 | 0x970 cmp %rax, %rax | |
| 7 | 0x974 je 0x983 // not-taken | TNT(0) |
| 8 | 0x979 jmpq 0xe10 | |
| 9 | 0xe10 leaveq; retq | TIP(0x90a) |

In the above example of IPT-based processor trace generation, a processor trace packet is only logged when a non-statically known (e.g. conditional) control flow change occurs. Processor trace packets are not logged when a processor executes an unconditional direct branch. See Table 1, execution control flows 3 and 8. In the case of a logged conditional trace packet, the branch is compressed to a single bit that identifies whether the condition was met that resulted in the conditional branch flow being taken. See Table 1, execution control flows 1 (branch taken) and 7 (branch not-taken). Other control flow will generate the target addresses of indirect branches, exceptions and interrupts. See Table 1, execution control flows 2 and 9 (TIP packets). In other control flow example processor trace packets are logged that contain the source addresses for asynchronous event execution control flows (e.g., FUP trace packets).

Table 2, provided below, lists types of change of flow instructions (CoFI) corresponding processor trace output provided by IPT.

TABLE 2

| CoFI type | Scenarios | Output |
|---|---|---|
| Unconditional Direct Branch | JMP and CALL (direct) | No output |
| Conditional Branch | Jcc, J*CXZ, LOOP | TNT |
| Indirect Branch | JMP and CALL (indirect) | TIP |
| Near Ret | RET | TIP |
| Far Transfers | Interrupts, traps, etc. | TIP\|FUP |

Using the IPT-based processor trace packet generation rules, there is less than 1 bit information recorded for each retired instruction on average. Moreover, the IPT output log generation configuration scheme supports event filtering based on current privilege level (CPL). For example, log generation can be configured using a CR3 value, which represents the page directory base register, or certain instruction pointer (IP) ranges—both of which can be leveraged to pre-filter (and discard) processor trace packets.

The relatively fast processor trace generation mechanism provided by IPT comes at a higher cost associated with decoding logged processor trace packets. The highly encoded (but compact) processor trace packets rendered by IPT is incomplete. Therefore, a decoder of the processor trace packets, during decoding, associates the logged processor packets with the corresponding binaries when it is desired/necessary to reconstruct the program flow that resulted in a (problematic) processor trace packet. For example, during reconstruction of an execution control flow from a processor trace packet, an implementation of an IPT decoder library uses the instruction flow layer of abstraction, which parses the program binary instruction by instruction, and combines the traced packets with the parsed binary instructions for the entire decoding.

The INTEL processor trace packet generation mechanism exhibits several beneficial traits including: precise tracing, low tracing overhead and event filtering. However, IPT also exhibits non-desirable characteristics including incomplete processor trace packet generation and resulting slow decoding. As a consequence, IPT output by itself is useful for offline analysis such as performance profiling, tuning and software debugging. The IPT approach to processor tracing trades off undesirable slow decoding against desirable fast generating of processor trace packets. IPT, in its current implementation of monitoring/analyzing execution control flows, relies on offline reconstruction to derive complete control flow information arising from executed code blocks.

SUMMARY OF THE PATENT APPLICATION

Embodiments of the patent application provide a method and a computer system including a hardware processor (e.g. an INTEL processor including IPT functional hardware) and non-transitory computer readable medium including instructions that facilitate carrying out the method. The embodiments provide a technical solution of reducing a degree to which kernel resources are needed to carry out enforcement of control flow integrity (CFI) on a protected process executing in a runtime environment of a computer system.

According to a first aspect, an embodiment provides a CFI enforcement method performed on a protected process executing in a runtime environment of a computer system, the method comprising:

intercepting a system call originating from execution of the protected process executing in the runtime environment;

accessing from a kernel memory, by a fast path within a kernel of the computer system, a processor trace packet corresponding to the system call;

matching, by the fast path, the processor trace packet to a program control flow (edge) entry within a credit-labeled control flow graph (CFG) definition having an associated credit value that represents a degree to which the program control flow is credible; and invoking, after the matching, a slow path for further processing of the processor trace packet if the associated credit value does not meet a specified threshold, and otherwise providing an indication to permit execution of the system call.

In a first implementation of the first aspect, the associated credit value is determined by a fuzzing operation performed on the protected process during a configuration procedure for rendering the CFG.

In accordance with a particular embodiment of the first implementation of the first aspect, the fuzzing operation is carried out using random data input.

In a second implementation of the first aspect, the indication to permit execution is provided to a corresponding handler of the system call.

In a third implementation of the first aspect, the processor trace packet is an INTEL processor trace packet.

In a fourth implementation of the first aspect, the program flow entry corresponds to a execution flow between a first code block and a second code block of the protected process.

In accordance with a particular embodiment of the fourth implementation of the first aspect, the program flow entry within the credit-labeled CFG definition corresponds to a conditional control flow.

In a fifth implementation of the first aspect, the credit-labeled CFG definition is derived from a conservative CFG containing: entries representing conditional control flows, and entries representing unconditional control flows.

According to a second aspect, an embodiment provides a computer processing node configured to perform a control flow integrity (CFI) method, the computer processing node comprising:

a processing hardware; and a non-transitory computer readable medium including computer-executable instructions that, when executed by the processing hardware, facilitate the computer processing node carrying out the CFI method comprising:

intercepting a system call originating from execution of the protected process executing in the runtime environment;

accessing from a kernel memory, by a fast path within a kernel of the computer system, a processor trace packet corresponding to the system call;

matching, by the fast path, the processor trace packet to a program control flow (edge) entry within a credit-labeled control flow graph (CFG) definition having an associated credit value that represents a degree to which the program control flow is credible; and invoking, after the matching, a slow path for further processing of the processor trace packet if the associated credit value does not meet a specified threshold, and otherwise providing an indication to permit execution of the system call.

In a first implementation of the second aspect, the associated credit value is determined by a fuzzing operation performed on the protected process during a configuration procedure for rendering the CFG.

In accordance with a particular embodiment of the first implementation of the second aspect, the fuzzing operation is carried out using random data input.

In a second implementation of the second aspect, the indication to permit execution is provided to a corresponding handler of the system call.

In a third implementation of the second aspect, the processor trace packet is an INTEL processor trace packet.

In a fourth implementation of the second aspect, the program flow entry corresponds to a execution flow between a first code block and a second code block of the protected process.

In accordance with a particular embodiment of the fourth implementation of the second aspect, the program flow entry within the credit-labeled CFG definition corresponds to a conditional control flow.

In a fifth implementation of the second aspect, the credit-labeled CFG definition is derived from a conservative CFG containing: entries representing conditional control flows, and entries representing unconditional control flows.

BRIEF DESCRIPTION OF THE DRAWINGS

While the appended claims set forth the features of the present patent application with particularity, the patent application and its advantages are best understood from the following detailed description taken in conjunction with the accompanying drawings, of which:

DETAILED DESCRIPTION OF THE DRAWINGS

The INTEL Processor Trace (IPT) feature of INTEL processor hardware provides detailed processor trace records with minimal resource consumption and/or processor slowdown. However, IPT poses a significant challenge for being used as an online detection mechanism because runtime processor traces rendered by IPT are highly compressed. Decoding the compressed trace records is generally orders of magnitude slower than producing the processor trace records. A CFI enforcement mechanism is described, by way of example, herein that combines offline control flow graph (CFG) construction and online control flow monitoring of a stream of processor trace packets (e.g., IPT packets) to enforce CFI in an online computing environment. In the illustrative examples, a CFG record format conforms to a processor trace packet format rendered by processor hardware (e.g. IPT packet format) that enables direct comparison between individual processor trace packets and CFG records.

Thus, the described CFI enforcement mechanism, described by way of example herein, is closely integrated with a processing hardware and an operating system architecture of a computing system. The resulting CFI enforcement mechanism meets simultaneously existing needs of online CFI enforcement for high degrees of: precision, efficiency and transparency. The CFI enforcement mechanism described herein retrieves and uses processor hardware-generated processor trace packets (e.g., Intel Processor Trace (IPT) packets) generated by the processor hardware. In an online processing environment, the processor trace packets are retrieved and compared with a control flow graph (CFG) containing a pre-configured relevant set of allowed/expected calls between program code blocks to detect abnormal/unexpected control flows. The CFG is generated offline based upon a static (offline) analysis that is augmented by a dynamic analysis (e.g., fuzzing) of the program code of interest. Thereafter, in an online environment, remedial action is taken to prevent harm from arising upon detection of abnormal/unexpected control flow between the program computing blocks based upon a comparison of processor trace packets and the pre-configured CFG (described in detail herein below). Precision in the CFI enforcement mechanism described herein arises from monitoring every processor trace packet rendered by the processor. Since the processor trace generation functionality is implemented in the processor hardware, the rendering of the processor trace records is very efficient in that is adds very low-overhead during runtime of a program of interest. The CFI enforcement system described herein also exhibits transparency since no binary instrumentation is needed and the system can be readily deployed on commodity hardware processors that have the ability to render processor trace records at runtime of a program.

Additionally, the CFI enforcement mechanism described herein addresses the problem of high decoding overhead by at least initially avoiding dynamically decoding the processor traces. Instead, a control flow graph (CFG) definition, to which the compressed IPT output can be directly compared, is configured offline. The CFG definition contains a set of edges connecting code blocks. The CFG definition edges contain control flow descriptions corresponding to the expected control flows (visually depicted in the form of edges—i.e. lines connecting code blocks—of a graphical representation/depiction of a CFG) between code blocks of a particular program or related programs. Each edge definition represented in the preconfigured CFG definition includes an indication, for each corresponding control flow, of a "credit" that represents a degree to which the flow is credible when encountered in an online processor trace record rendered by IPT. Thus, a manageable set of valid edges of the configured CFG definition can be rendered and stored in a form that can be directly compared at runtime with compressed processor trace records generated by the processor hardware (e.g. IPT trace records).

Figure 1:
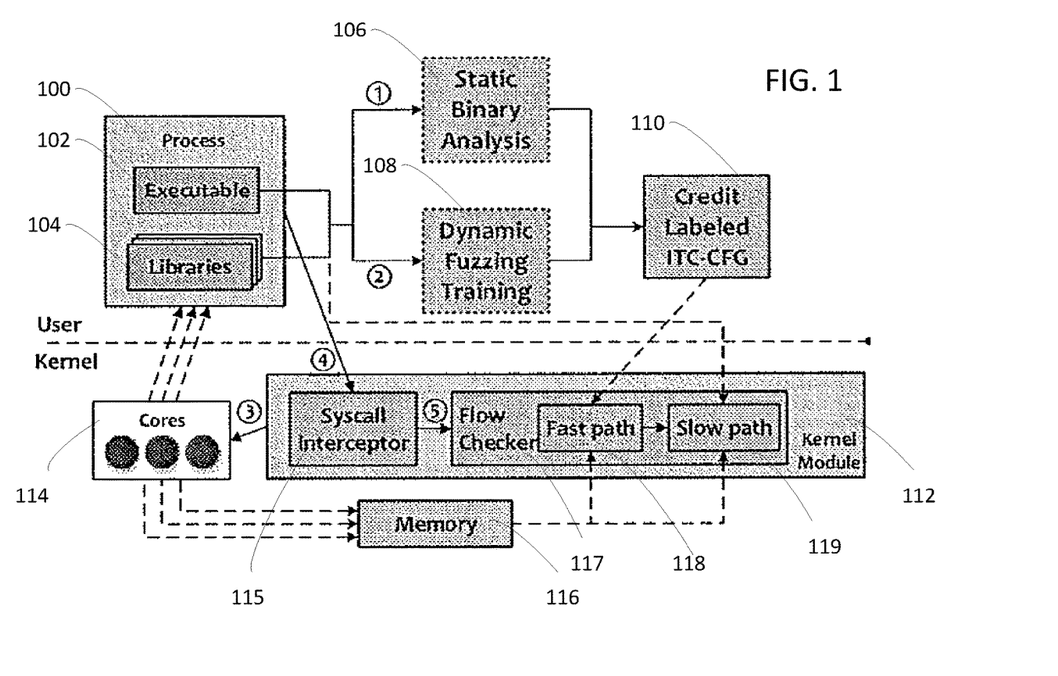
FIG. 1 illustratively depicts a combination of structural/functional components of an overall computer processing architecture incorporating an illustrative CFI enforcement mechanism.

Attention is initially directed to FIG. 1 that illustratively depicts a combination of hardware and operating system functional components (processor cores, kernel operations, user operations) configured to carry out the illustrative CFI enforcement mechanism in an exemplary computer processing architecture. During configuration, a protected process 100, including a protected executable binary 102 and a set of shared libraries 104, is analyzed by a static binary analysis 106 stage to generate an ITC-CFG definition. See FIG. 3B described herein below. The ITC-CFG definition specifies a set of edges representing all indirect (conditional) flows between executable blocks of the protected process 100.

With continued reference to FIG. 1, a fuzzing training module 108 applies a generated set of input values (in accordance with fuzzing training objectives) to the protected executable binary 102 and the set of shared libraries 104 to render credit (credibility level) labels for the set of control flows (edges) defined in the ITC-CFG rendered by the static binary analysis 106. By way of example, trained (high credibility) edges are labeled with high credit (credibility) values and associated with TNT information. Control flows that were rarely or never executed during the fuzzing training are labeled with low credit (credibility) values. Upon completion of configuration of a CFG definition, the credit-labeled edges of the ITC-CFG are stored as a credit-labeled ITC-CFG definition 110.

The compact nature of the resulting credit-labeled ITC-CFG definition 110 facilitates runtime comparisons to the stream of processor trace packets generated by a set of processing cores 112 operating in the kernel. By way of example, a kernel module 112 carries out CFI enforcement based upon the credit-labeled ITC-CFG definition 110. More particularly, the kernel module 112, by way of example, configures a set of CPU cores 114 to generate a stream of processor trace packets based upon a set of program block calls generated during operation of the protected process 100 that have been intercepted. By way of example, process call filtering is carried out by selectively enabling operation of the kernel module 112 according to CR3 values provided to the set of processor cores 114 during initialization of the system to carry out CFI enforcement during execution of the protected process 100. The resulting processor trace packets provided by the set of processor cores 114 at runtime are sent to a pre-configured (FIFO) buffer in a memory 116 for CFI enforcement processing by the kernel module 112.

During runtime of the protected process 100, in accordance with the preconfigured call filtering criterion described above, the set of processor cores 114 commences generating processor trace packets that are thereafter stored in the configured buffer space of the memory 116. In an illustrative example, a system call (syscall) interceptor 115 is triggered to commence flow checking on the resulting/ buffered processor trace packets, corresponding to security-sensitive system calls, stored by the set of processor cores 114 in the pre-configured buffer space of the memory 116.

Figure 4:
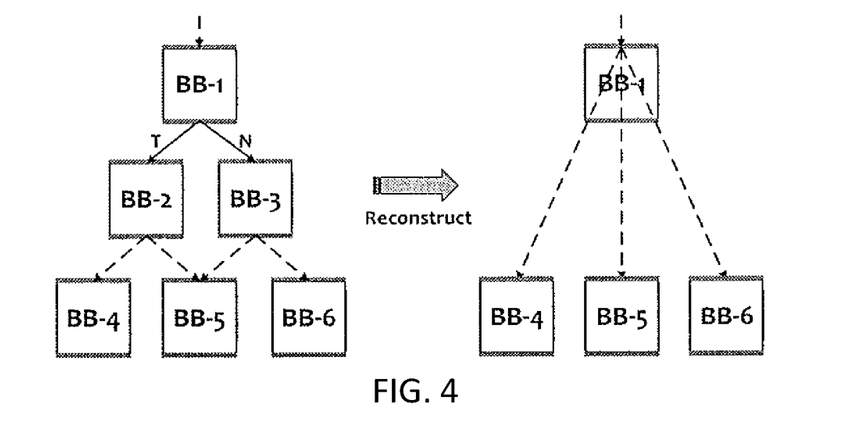
FIG. 4 is an illustrative example of conservative CFG to ITC CFG reconstruction.

During a control flow integrity checking by a flow checker 117 of the kernel module 112 on a processor trace packet record previously stored in the memory 116, a fast path module 118 processing operation on the processor trace packet record retrieved from the memory 116 takes precedence over a slow path module 119. In general, the fast path module 118 carries out a rapid comparison to credible (high credit value labeled) edges from the credit labeled ICT-CFG definition 110 to potentially clear the retrieved processor trace of being associated with malicious (not present in the credit-labeled ITC CFG definition 110) or suspicious (low credit value). In an illustrative example, the suspicious processor trace/code triggers further processing by the relatively slow checking carried out by the slow path module 119. The operation of the kernel module 112 is described further herein below with reference to FIG. 4.

Figure 2:
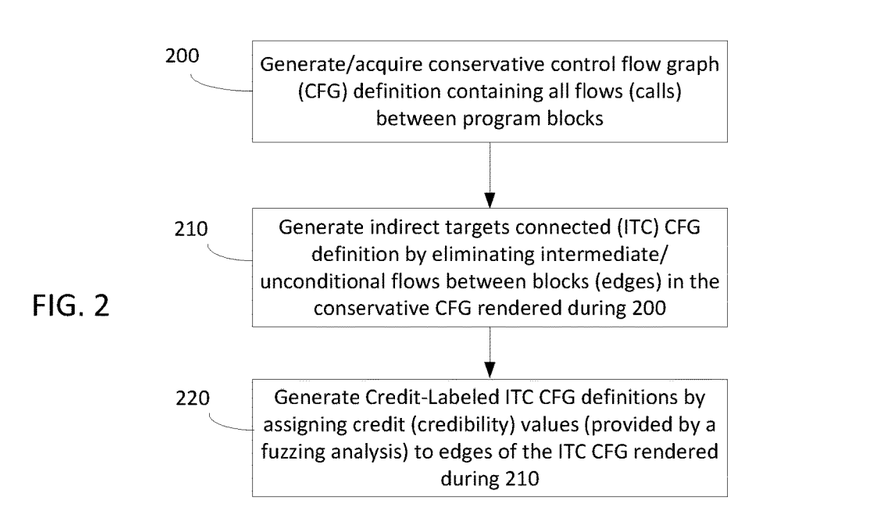
FIG. 2 is a flowchart summarizing operations of an illustrative method for generating a control flow graph (CFG) definition generated prior to online operation of the CFI enforcement mechanism for a particular executable computer program.

Turning to FIG. 2, an example of offline configuration of the CFG definition is summarized. In the particular example of offline pre-configuring the CFG definition for online CFI enforcement, during 200 a conservative CFG definition is generated/acquired that contains all potential edges between program code blocks (blocks). A simple illustrative example of the conservative CFG rendered during 200 is illustratively depicted in FIG. 3A. The conservative CFG configuration is thereafter converted during 210 into an indirect targets connected (ITC) CFG definition containing a set of indirect (conditional) edge records conforming to a format of processor trace packets rendered by the IPT feature of INTEL processors. Next, a coverage-oriented fuzzing operation (applying a set of random inputs and observing resulting call flow) is performed on the program code during 220 to establish and assign credit (credibility) values and branching information to the edges of the ITC CFG definition rendered during 210. Each of the above-described CFC definition configuration operations is described further herein below with reference to FIGS. 2, 3A, 3B and 3C.

With continued reference to FIG. 2, during 200 static binary analysis is performed on the protected process 100 to render the conservative CFG definition. In an exemplary embodiment during conservative CFG definition generation existing binary-based approaches are used to disassemble and analyze the protected executable binary 102 and the set of shared libraries 104. The conservative CFG is conservative in the sense that all possible outgoing edges for indeterminable indirect branches may be more than necessary and result in excessive false positives where legitimate control flows are identified, during runtime checking of IPT processor trace packets, as potentially malicious and precluded from executing during runtime checking. During 200 the modules of the protected executable binary and the set of shared libraries 104 are analyzed independently to construct intramodule CFG edges. Thereafter, inter-module CFG edges are constructed using a procedure linkage table (PLT) exposed by a dynamic linking mechanism. Different modules can only be connected by the indirect jumps in the PLT as well as the corresponding return instructions from callees to callers. Also, during 200, edges among the particular basic blocks are accordingly added to the conservative CFG definition. To handle the global symbol interpose problem where one symbol may exist in different modules, the information (e.g., DT NEEDED) fields in the binaries are used to find a prior library and bind a symbol to the specific address. Another type of inter-module branches is due to the virtual dynamically-linked shared object (VDSO) mechanism, which is used to accelerate syscall invocation. For instance, the gettimeofday( ) usually results in VDSO function call instead of library call. The functions within the VDSO segments take precedence over libraries.

During 200, when generating intra-module CFG edges, each direct call/jump instruction has one exact outgoing target and each conditional branch has two possible targets. For indirect calls, targets using TYPEARMOR's use-def and liveness analysis are restricted, and the return instructions are connected to the valid return addresses right after the call sites in a manner like call/return matching. If the above approach is unsuccessful to define an CFG edge, then analysis of the underlying binary framework is relied upon to conservatively resolve indirect jumps.

Another issue arising from generating the conservative CFG definition for the protected process 100 is handling tail-call optimization. A tail call is normally issued in the final part of a function (e.g., fun_b). The tail call reuses the current stack frame and uses a "jump" command instead of a call to a target function (fun_c) and pretending that it is being called by the caller (fun_a) of the current function (fun_b). In this case, the return instruction of the fun_c should go back to fun_a, even though there is no call from fun_a to fun_c. The process for generating a corresponding edge in the conservative CFG definition detects and handles tail calls by emulating the execution of the target function. During emulation, the branch instructions are sequentially followed and any inter-procedure jump instructions targeted at function entries are collected. Furthermore, the return instructions of those functions are connected to the return address after the very beginning call site. The sequential following and recording of jumps continues until a specific stop condition is encountered.

Figure 3A:
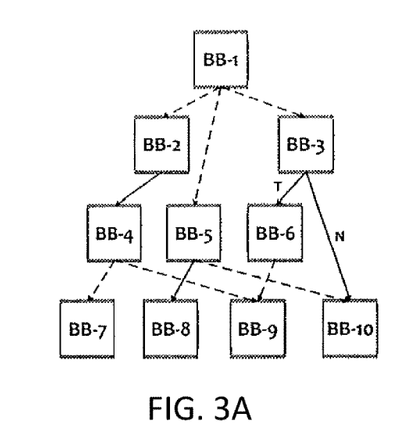
FIGS. 3A, 3B and 3C illustratively depict examples CFG definition states associated with the output rendered by each of the three stages/operations of the method summarized in FIG. 2.

An example of the conservative CFG is shown in FIG. 3A for purposes of comparison to the reduced set of blocks and edges of a corresponding ITC CFG definition rendered during 210 described in detail herein below. As shown in the illustrative example provided in FIG. 3A, the basic blocks are connected with each other by either direct or indirect branches as edges. In the illustrated example, each defined edge is associate an exit address of a source block (e.g., BB-4) and an entry address of a target block (e.g., BB-7).

Continuing to refer to FIG. 2, during 210 parsing on the conservative CFG definition renders the ITC CFG definition containing a set of records having a format that is compatible with (e.g. facilitates direct comparison of fields within) processor trace packets rendered by the set of processor cores 114. The conservative CFG definition generated during 200 is incompatible encoded (compressed) processor traces generated by INTEL's IPT processor-embedded functionality. During 210, the conservative CFG definition output rendered during 200 is further processed to generate a set of defined edges that are compatible with the output of INTEL's IPT functionality that renders processor trace packets solely for indirect branches. INTEL's current implementation of IPT generates respective packets for a specific change of flow instruction (CoFI) type. Only two types of processor trace packets generated by IPT are supportive for CFI enforcement-based checking: (1) a TNT processor trace packet indicating whether a conditional branch is taken, and (2) a TIP packet recording a target address of an indirect branch.

In an illustrative example, during generation of the ITC CFG only TIP processor trace packets are supported in order to: (1) avoid path explosion, and (2) support fast online search of a relatively small/readily scannable set of ITC-CFG edge definition records. All edges are collapsed that have direct types such that the target basic blocks of the indirect branches are connected to each other, and each edge associates the entry address of one indirect target basic block to the entry address of another indirect target basic block.

Figure 3B:
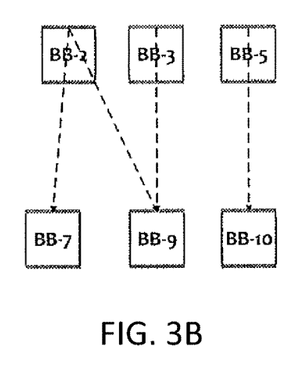

Attention is directed to FIG. 3B that represents the ITC CFG definition rendered during 210 by processing the input conservative CFG definition (FIG. 3A). For simplicity, blocks within the protected process 100 are identified as "BB-n" with "n" corresponding to the nth basic block referenced in FIGS. 3A, 3B and 3C. In the illustrative example, FIG. 3A includes both direct and indirect edges. Processing the conservative CFG during 210 to render IPT-compatible edge definitions (depicted in FIG. 3B) involves only considering basic blocks that are targets of at least one indirect edges. See e.g., BB-2 (the target basic block of indirect edge incoming from BB-1). On the other hand BB-4 is not the target of any indirect edges. Thus the basic blocks (BB) numbered 2, 3, 5, 7, 9, 10 in FIG. 3A are present in the ITC-CFG definition of FIG. 3B. Such blocks are referred to herein as indirect target basic blocks (IT-BBs).

During edge reconnection between source/target basic blocks, each edge is re-associated from one IT-BB to a nearest IT-BBs if there is one indirect edge in the path in O-CFG. For instance, in O-CFG from BB-3 to BB-9, there is one indirect edge from BB-6 to BB-9, thus in the ITC-CFG definition example of FIG. 3B, there is one edge connected from BB-3 to BB-9. While there is no indirect edge in the path from BB-3 to BB-10 in OCFG, BB-3 is not connected to BB-10 in ITC-CFG. Thus, if there is no indirect branch from one IT-BB to another IT-BB, then no TIP packet will be generated by IPT during runtime, and there should be no connection between the two IT-BBs even if they are both IT-BBs and connected by direct edges. Furthermore, since TIP packets reveal a target memory address of an indirect branch, the edges of the ITC-CFG definition (rendered during 210 processing of the conservative CFG output of 210) connect the entry addresses of the IT-BBs to each other, instead of bridging the exit of one with the entry of another, as shown in FIG. 3A. For example, there are 6 IT-BBs (out of the initial 10 basic blocks of the conservative CFG) left in the ITC-CFG definition in FIG. 3B. Importantly, the edges of the ITC-CFG definition in FIG. 3B are reconnected so that the TIP packet flow generated by IPT at runtime can be directly searched on edges defined in the ITC-CFG definition rendered during 210.

For the correctness of the ITC-CFG definition generated during 210, suppose at a randomly selected time the entry address of BB-x is recorded, then BB-x must be one of the IT-BBs, otherwise there is no indirect branch targeting at it, thus no TIP packet should be traced according to the tracing scheme of IPT. Now suppose the next immediate time another entry address of BB-y is recorded, then we should prove that there is one edge connecting from BB-x to BB-y in the ITC-CFG. By reduction, if there is no edge from BB-x to BB-y in the ITC-CFG, which means there is no edge of indirect branch in the path from BB-x to BB-y in the O-CFG. Then, BB-y should not be executed or traced. Therefore, for any two consecutive TIP packets traced by IPT, there must be an edge in ITC-CFG to represent this control flow, otherwise some anomalies have happened.

During 220, dynamic fuzzing training (e.g. supplying random call data to function calls and observing resulting call patterns) results are used to label the edges of the ITC-CFG definition rendered during 210 by assigning a credit (credibility) value and TNT information to each ITC-CFG edge within the ITC-CFG definition. While the ITC-CFG allows direct searching of IPT traces, which addresses issues of processing speed necessary for carrying out online CFI enforcement, there are still two security issues that arise from the ITC CFG rendered during 210: coarse-grained CFI and precision loss. Regarding coarse-grained CFI, there are still large quantities of false negatives (failing to identify execution of a malicious code) during runtime flow checking arising from coarse-grained CFI enforcement. Also, coarse-grained CFI enforcement arising from conservative CFG definitions can lead to superfluous legal targets for each branch, resulting in bypassed protection and undetected malicious attacks.

Regarding precision loss, the ITC CFG definition rendered during 210 may weaken the security provided by the conservative CFG due to CFG coarsening. This problem can be illustrated by using a metric, summarized in equation (1) below, called Average Indirect targets Allowed (AIA):

$$AIA = \frac{1}{n}\sum_{i=1}^{n} |T_i| \qquad \text{(equation 1)}$$

where n is the number of indirect branch instructions,

Ti is the set of allowed targets for the i th indirect branch instruction.

Intuitively, a smaller AIA represents a more precise CFG definition. As such, AIA may be one of the most appropriate metrics for measuring CFI enforcement strength, especially when the protected software involves large code base. Consider a conservative-to-ITC CFG reconstruction example shown in FIG. 4. In the conservative CFG, the AIA is 2. In the ITC-CFG, the AIA is 3, which means the ITC CFG definition is less precise than the original one. In this example, the number of allowed targets for BB-2 and BB-3 changes from 2 to 3 after reconstructing the conservative CFG to render the ITC CFG. This precision derogation is due to the absence of direct branches information that may fork the control flow. The only possible direct branches being able to fork the execution flow are the conditional branches, the taken or non-taken (TNT) branches from BB-1 to BB-2 or BB-3 in this specific example. The ITC CFG definition removes these edges to avoid path explosion. This shortcoming of ITC CFG configuration is remedied during 220 by applying a fuzzing analysis to the ITC CFG rendered during 210. Fortunately this TNT information is traced by IPT, which can be used to strengthen the ITCCFG during the training phase.

During 220 a (fuzzing) training phase is performed to generate a set of credit (credibility) label values and additional TNT information that are added to the edge records defined in the ITC CFG during 210. The decision of whether to label an edge with a high credit (credibility) value depends on whether a processor trace packet corresponding to the edge was encountered during the fuzzing training. In consideration of achieving high coverage to minimize the requirement of heavy context-sensitive analysis, a coverage-oriented fuzzing-like set of inputs are generated for dynamic training during 220.

Fuzzing training is an effective approach to identify vulnerabilities in real-world protected processes. Fuzzing involves generating as many randomly selected data as possible. The randomly selected data is then used as an input for training the protected processes—a brute force approach to identifying possible process flow paths between basic blocks and to trigger potential security issues. Fuzzing is used in the illustrative example, instead of other dynamic techniques (e.g., symbolic execution), because it is simple and practical to deploy. However other forms of dynamic training to assign credit (credibility) values to edge records of the ITC CFG are contemplated in alternative embodiments.

By way of example, fuzzing training includes the following three steps:

Step 1: the trained application runs in QEMU, an open-source hosted hypervisor that performs hardware virtualization, with instrumentation logic implemented on top of it in user emulation mode. The instrumentation is responsible for discovering any new state transitions caused by the input.

Step 2: some initial test cases are provided and stored into one queue. The test cases in the queue are fetched one by one and mutated to generate new test cases using a balanced variety of fuzzing strategies. The resulting test cases are sequentially fed to the protected process software running in QEMU. If any mutated test case results in a new state transition as observed by the QEMU, it will be added to the queue for subsequent mutation. This phase will generate test cases that may trigger different path explorations.

Step 3: the test cases generated in step 2 are collected and used as inputs to feed the trained application running on the real hardware, leverage IPT to trace its execution flow, and lastly label the edges in ITC CFG definition rendered during 220 with high credit values (indicating credible edges) based on the processor trace data rendered during the fuzzing analysis.

Figure 3C:
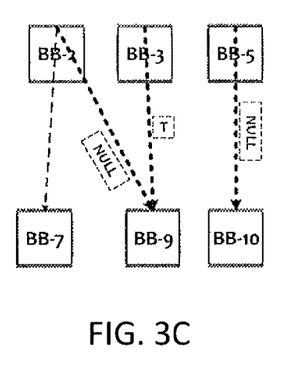

Labeling edges with credit values during 220 can be varied for different needs. For instance, one can use more than two levels of credit values to label the edges by assigning various values based on the number of times particular edges were encountered during the training phase. In a simplest case, a binary-based labeling scheme is used where each edge is assigned either with a high credit value or a low credit value. FIG. 3C illustratively depicts the labeled ITC CFG definition edges resulting from the (fuzzing) training during 220. In the particular illustrative example, all edges except the one from BB-2 to BB-7 in the ITC CFG definition are labeled with high credit values, and the sequences of TNT packets obtained during the training phase are associated with corresponding edges. This TNT information is important, in that with the direct forking information, a CFI enforcement operation described herein below can prevent attackers from derogating the AIA. Assigning a credit (credibility) value arising from training the protected process to identify and remove unused indirect edges arising from processing during 210, overcomes the potential problem of increased AIA arising from reconstructing the conservative CFG depicted in FIG. 4.

Importantly, fuzzing training is just one of a variety of potential operations that may be used to assign a credit value to individual edges of the ITC CFG definition rendered during 210. All such alternatives are contemplated in accordance with various implementations of the CFI enforcement mechanism and method described herein.

Figure 5:
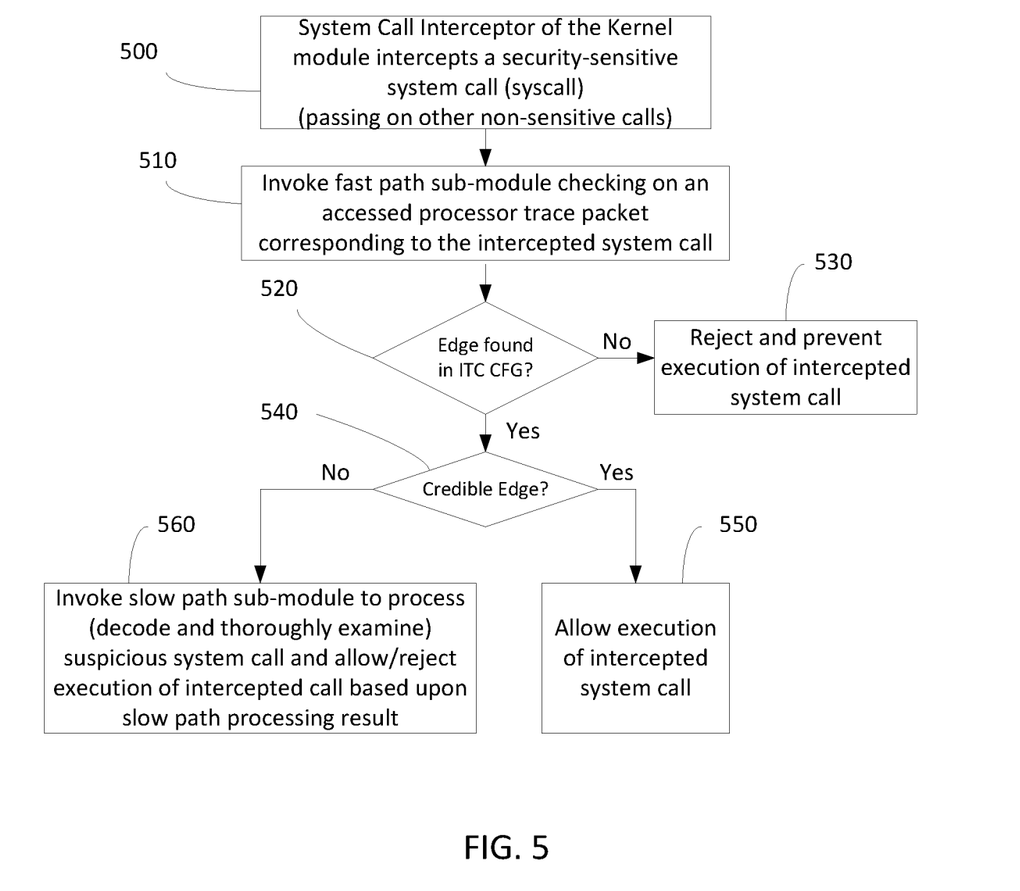
FIG. 5 is a flowchart summarizing the operations of an exemplary hybrid control flow integrity enforcement mechanism carried out in accordance with the CFG definition rendered by the method summarized with reference to FIG. 2 and FIGS. 3A, 3B and 3C.

Having described an exemplary architecture and configuration of the CFI enforcement mechanism and method, attention is directed to FIG. 5 that summarizes runtime operation of the configured CFI enforcement mechanism (kernel module 112) described herein. In general, the CFI enforcement method carried out during online operation of the computer system executing the protected process 100 code of interest incorporates a hybrid CFI checking mechanism containing a relatively fast (primary) path through the fast path module 118 that attempts to match each received processor trace (e.g. IPT) packet record retrieved from the memory 116 (buffer) to a corresponding credible edge represented in the credit-labeled ITC CFG definition 110. If a match is found between an IPT trace record and a credible edge record in the ITC CFG definition 110, then the processor trace is cleared (i.e., does not represent a security threat). However, if no match is found between the IPT processor trace packet and a credible ITC CFG edge record, then a suspicious/abnormal processor trace (program flow between two blocks) has been encountered. In response to the failure during operation of the fast path module 118 to find a match, operation of the CFI enforcement is diverted to the relatively slow (secondary) path in the case where a corresponding ITC CFG record having a low credit value is matched with the runtime processor trace.

It is contemplated that a vast majority of the runtime processor trace packets are initially "rejected" or "cleared" by operation of the fast path module 118. A processor trace packet is rejected if the processor trace packet does not match any edge in the credit-labeled ITC CFG definition. On the other hand, a processor trace packet is "cleared" by the fast path module 118 if the trace packet matches a credible edge contained in the credit-labeled ITC CFG definition 110. Only processor trace packets that match a non-credible (low credit value) edge record in the credit-labeled ITC CGF definition 110 are subjected to the overhead-heavy precise/thorough processor trace processing by the slow path module 119.

If properly trained the credit-labeled ITC CFG based processing diverts processor trace packet processing to the slow path module 119 for an extremely small fraction of the provided processor trace records. Such conditional execution of the slow CFI enforcement mechanism, which is limited to operating on processor trace packets matched during fast path processing to low credibility edges in the credit-labeled ITC CFG definition 110, provides an efficient and precise CFI enforcement mechanism for detecting reuse of code attacks on a computer system using the protected process 100.

With specific reference to previously discussed FIG. 1, the hybrid processing of processor trace packets retrieved from the memory 116 by the flow checker 117 is described herein below with reference to the summarized steps of FIG. 5. In the illustrative example, CFI enforcement relies on the kernel module 112 to protect the computer system during operation of the protected process 100. As illustrated in FIG. 1, the kernel module 112 generally performs: (1) configuring the set of processor cores 114 (e.g., IPT) to generate processor trace packets during execution flow of the protected process 100, (2) intercept specific security-sensitive system calls to trigger subsequent processor trace packet processing operations, and (3) checking the traced execution flow in fast and/or slow paths.

The operations summarized in FIG. 5 relate to operation of the kernel module 112 through interaction with the other identified components of the system depicted in FIG. 1. Prior to operation of the steps summarized in FIG. 5, the set of processor cores 114, operating under the configuration commands of the kernel module 112, start and keep tracing control flow of the protected process 110. The operation of the set of processor cores 114, with regard to processor trace packet generation comprises the following two basic steps:

Step 1: Enabling controls for packet generation. There are a variety of controls to determine whether the branch packets can be generated. The controls are enabled and configured, for example, by a collection of IA32_RTIT_* family model-specific registers (MSRs). In the illustrative example, among the most important is the IA32_RTIT_CTL MSR register that is the primary enable and control MSR for trace packet generation. The kernel module 112 sets the TraceEn and BranchEn bits to enable CoFI-based processor trace packet generating by the set of processor cores 114. This register also clears the OS bit and sets the User bit in order to exclusively trace user-level control flow. Meanwhile, the register also sets the CR3Filter bit to enable CR3 filtering mechanism, and configures the IA32_RTIT_CR3_MATCH MSR to the CR3 of the protected process. Finally this register clears the FabricEn bit to directly send the trace output to the memory 116, and sets the ToPA bit to enable a Table of Physical Addresses (ToPA) output scheme. Other bits of the IA32_RTIT_CTL MSR are left as default.

Step 2: Configuring memory regions for trace output. In the illustrative example, the trace output of INTEL's IPT can be configured to operate according to one of two output schemes: (1) a single contiguous region of physical address space, or (2) a collection of variable-sized regions of physical memory which are linked together by tables of pointers. In a particular example, the kernel module 112 utilizes the latter scheme which is referred above as Table of Physical Addresses (ToPA), and stores the trace output into one ToPA with two regions.

Selecting appropriate trigger points of flow checking determines the timeliness and performance of the protection provided by operation of the kernel module 112. One intuitive approach is triggering upon PMI and checking all of the packets in the interrupted region. This approach ensures all of the execution flow of the protected process 110 is checked. However, it may introduce significant overhead. Therefore, in an illustrative example, the kernel module 112 performs flow checking at specified security-sensitive endpoints. While such endpoints are configurable, the kernel module 112 pre-defines some default ones to provide reasonable guarantees of security.

By way of example, the pre-defined endpoints mainly consist of the specified security-sensitive syscalls, e.g., execve, mmap, mprotect. By way of example, during step 500 of the runtime operation of the kernel module 112 summarized in FIG. 5, the system call interceptor 115 of the kernel module 112 intercepts a security-sensitive system call (syscall) by temporarily modifying the syscall table and installing an alternative syscall handler for each intercepted syscall. Whenever such a syscall is invoked, the newly installed handler first checks whether it is called by the protected process 100 through the information like CR3, process name, or process ID. If the answer is yes, the checking is commenced, otherwise, it simply forwards (passes on) the execution of the system call to the corresponding original syscall handler for regular processing. The intercepted security-sensitive syscalls may originate from the protected executable binary 102 or the set of shared libraries 104. Therefore, the system call interceptor 115 is responsible for checking the execution flow of both executable and shared libraries.

If the flow checking failed, the kernel module sends a SIGKILL signal to the process and reports the detection of control flow violation to the administrators or users.

During 510, the fast path module 118 is invoked to process the intercepted system call by performing a matching operation between the corresponding processor trace packet retrieved from the memory 116 and the credit-labeled edges of the credit-labeled ITC CFG definition 110. The fast path module 118 verifies the processor trace packet corresponding to the intercepted system call based on a comparison of the processor trace packet to the credit-labeled edge records of the credit-labeled ITC CFG definition 110. The fast path module 118 initially fast decodes the traced packet stored in the ToPA region of the memory 116. At this stage, the fast path module 118 only parses the processor trace packets (based on the IPT formats) and extracts the TIP and TNT packets, without referring to the binaries with the instruction flow layer of abstraction. With the aid of packet stream boundary (PSB) packets, which serve as synchronization points for the decoder, this process can be performed in parallel to further accelerate decoding. On the other hand, it is not required to decode the whole ToPA buffer. Instead the fast path module 118 only checks a specified number of TIP packets. And in consideration of guarding against attacks which hack in one module and invoke a system call in another, the kernel module 112 is ensured to decode TIP packets straddling multiple modules' memory regions, and where at least one of them is within the protected process 100.

After acquiring runtime collected indirect target addresses corresponding to the intercepted system call, the fast path module 118 attempts to matches the addresses to the addresses of the edge records in the credit-labeled ITC CFG definition 110. Specifically, the kernel module 112 maintains an array of data structures for source nodes in the edges represented in the credit-labeled ITC CFG 110. Each edge source node has an associated count field that indicates a number of its outgoing edges and a pointer pointing to the start of the array of its target addresses. By way of example, all of the arrays are sorted according to the addresses, so that a binary search may be used during matching by the fast path module 118 to reduce the time duration. To further accelerate the matching process, the kernel module 112 reserves separate memory dedicated to storing the source nodes and their targets connected by edges with high credits and TNT information, and uses it as the cache for fast matching by the fast path module 118 during 510. During the fast path checking, for each address recorded in the TIP packet, the fast path module 118 first checks it by searching on the array of source nodes and then checks that its successor address can be found in the array of its target addresses. Upon completion (successful or unsuccessful) of the matching attempt by the fast path module 118 during 510, control passes to 520.

During 520, if either of the two addresses checks fails to render a match between the processor trace packet addresses and addresses of an edge in the credit-labeled ITC CFG 110, then the matching attempt by the fast path module 118 fails, a reuse of code attack has been detected, and control passes to 530 where an alarm is raised to invoke the corresponding system call handler to invoke further processing of the rejected intercepted system call to prevent execution of the malicious system call.

If, on the other hand, a matching edge entry is found in the credit-labeled ITC CFG 110, then control passes to 540. At 540, the fast path module 118 accesses the credit value associated with the matching edge entry. If the credit value meets a threshold value for indicating a match between the processor trace packet and a credible edge, then control passes to 550 where the fast path module 118 issues a response to the corresponding system call handler indicating that the system call may be executed.

Otherwise, if the processor trace packet is matched during 540 to an edge having a credit value that does not meet a threshold for credibility, then control passes to 560.

During 560, operation of the slow path module 119 is invoked on the system call matched to an edge record, in the credit-labeled ITC CFG definition 110, determined to have a low credit value during 540, the flow checking is forwarded to the slow path engine. By way of example, besides the TIP and TNT packets used by the fast path module 118 during fast matching, the inputs for the slow path module 119 include the binaries of the protected process 100. By way of example, the analysis performed by the slow path module 119 is INTEL's reference implementation of the IPT decoder library, which uses an instruction flow layer of abstraction, parses the binaries instruction by instruction, and combines the traced packets for the complete decoding. In the illustrative example, whenever the slow path checking is triggered, the kernel module 112 issues an upcall to a waiting user-level process to finish the task.

A wide variety of slow-path processing operations on the suspected malicious system call indicated during 540 are contemplated based upon a variety of policies and levels of protection desired for a particular system. The policies enforced in the slow path module 119 may be very precise, as the kernel module 112 can capture the whole execution flow and further perform a context-sensitive analysis. At a very basic level, the kernel module 112 ensures that process trace packets of intercepted system calls conform to the conservative CFG based implementation of CFI enforcement with the fine-grained forward edge analysis. In addition, for backward edge analysis, a shadow stack is maintained using the instruction flow layer of abstraction, and compared with the traced packets to enforce a single-target policy for the return branches.

While the provided illustrative examples are described with reference to a specific processor environment that includes an INTEL Skylake processor including built-in IPT functionality, the described hybrid processing is applicable to a vast variety of processor trace providers. In the IPT processing environment, processor trace records associated with critical system calls are analyzed/compared during CFI checking. The CFI enforcement mechanism described herein may be used to transparently defend against ROP-like control flow hijacking attacks. Importantly, the hybrid approach coupled with well-formulated ITC CFG definition pre-configuration allows CFI enforcement with only a small performance slowdown. Moreover, the hybrid CFI enforcement can exhibit further overhead reductions by adding hardware extensions such as a hardware-assisted fast decoder.

Thus in summary, the hybrid CFI enforcement mechanism, including a pre-configured ITC-CFG definition for fast path matching of processor traces and credible CFG edges, provides a fully transparent mechanism for CFI enforcement including detecting CFI violations during online operation of a program comprising a manageably limited number of credible calls between code blocks. The ITC CFG is initially rendered by adapting a complete CFG definition to a form of output rendered by processor trace generator (e.g., ITC). Accuracy and efficiency are further enhanced by dynamically training an initially rendered ITC CFG with random data input during a fuzzing training of the ITC CFG that enables identifying and labeling (with credits and branch taking information) of credible edges (program control flows between code blocks of one or more programs) represented in the pre-configured ITC CFG definition.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

Examples are described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the patent application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the patent application and does not pose a limitation on the scope of the patent application unless otherwise claimed. No language in the specification should be construed as indicating any non-claimed element as essential to the practice of the patent application.

Exemplary embodiments are described herein known to the inventors for carrying out the patent application. Variations of these embodiments may become apparent to those of ordinary skill in the art upon reading the foregoing description. The inventors expect skilled artisans to employ such variations as appropriate, and the inventors intend for the patent application to be practiced otherwise than as specifically described herein. Accordingly, this patent application includes all modifications and equivalents of the subject matter recited in the claims appended hereto as permitted by applicable law. Moreover, any combination of the above-described elements in all possible variations thereof is encompassed by the patent application unless otherwise indicated herein or otherwise clearly contradicted by context.

What is claimed is:

1. A control flow integrity (CFI) enforcement method performed on a protected process executing in a runtime environment of a computer system, the method comprising:
   intercepting a system call originating from execution of the protected process executing in the runtime environment;
   accessing from a kernel memory, by a fast path within a kernel of the computer system, a processor trace packet corresponding to the system call;
   matching, by the fast path, the processor trace packet to a program control flow entry, within a credit-labeled control flow graph (CFG) definition, having an associated credit value that represents a degree to which a program control flow, represented by the program control flow entry, is credible; and
   invoking, after the matching, a slow path for further processing of the processor trace packet if the associated credit value does not meet a specified threshold, and otherwise providing an indication to permit execution of the system call,
   wherein the associated credit value is determined by a dynamic fuzzing analysis operation performed on the protected process during a configuration procedure for rendering the CFG.

2. The CFI enforcement method of claim 1, wherein the dynamic fuzzing analysis operation is carried out using random data input.

3. The CFI enforcement method of claim 1, wherein the indication to permit execution is provided to a corresponding handler of the system call.

4. The CFI enforcement method of claim 1, wherein the program control flow entry corresponds to an execution flow between a first code block and a second code block of the protected process.

5. The CFI enforcement method of claim 4, wherein the program control flow entry within the credit-labeled CFG definition corresponds to a conditional control flow.

6. The CFI enforcement method of claim 1, wherein the credit-labeled CFG definition is derived from a conservative CFG containing:
   entries representing conditional control flows, and
   entries representing unconditional control flows.

7. A computer processing node configured to perform a control flow integrity (CFI) method, the computer processing node comprising:
   a processing hardware; and
   a non-transitory computer readable medium including computer-executable instructions that, when executed by the processing hardware, facilitate the computer processing node to carry out the CFI method comprising:
   intercepting a system call originating from execution of the protected process executing in the runtime environment;
   accessing from a kernel memory, by a fast path within a kernel of the computer system, a processor trace packet corresponding to the system call;
   matching, by the fast path, the processor trace packet to a program control flow entry, within a credit-labeled control flow graph (CFG) definition, having an associated credit value that represents a degree to which a program control flow, represented by the program control flow entry, is credible; and invoking, after the matching, a slow path for further processing of the processor trace packet if the associated credit value does not meet a specified threshold, and otherwise providing an indication to permit execution of the system call, wherein the associated credit value is determined by a dynamic fuzzing analysis operation performed on the protected process during a configuration procedure for rendering the CFG.

8. The computer processing node of claim 7 wherein the dynamic fuzzing analysis operation is carried out using random data input.

9. The computer processing node of claim 7, wherein the indication to permit execution is provided to a corresponding handler of the system call.

10. The computer processing node of claim 7, wherein the program control flow entry corresponds to an execution flow between a first code block and a second code block of the protected process.

11. The computer processing node of claim 10, wherein the program control flow entry within the credit-labeled CFG definition corresponds to a conditional control flow.

12. The computer processing node of claim 7, wherein the credit-labeled CFG definition is derived from a conservative CFG containing:

entries representing conditional control flows, and
    entries representing unconditional control flows.

* * * * *